US007635300B2

(12) United States Patent
Kojima et al.

(10) Patent No.: US 7,635,300 B2
(45) Date of Patent: Dec. 22, 2009

(54) DAMAGE CONTROL GAME PROGRAM AND GAME MACHINE

(75) Inventors: Hideo Kojima, Tokyo (JP); Sadaaki Kaneyoshi, Tokyo (JP)

(73) Assignee: Konami Computer Entertainment Japan, Inc., Tokyo (JP)

( * ) Notice: Subject to any disclaimer, the term of this patent is extended or adjusted under 35 U.S.C. 154(b) by 649 days.

(21) Appl. No.: 10/745,121

(22) Filed: Dec. 23, 2003

(65) Prior Publication Data

US 2004/0254004 A1 Dec. 16, 2004

(30) Foreign Application Priority Data

Jun. 10, 2003 (JP) ............................. 2003-165248

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................... 463/1; 463/23; 463/24; 463/30; 463/31; 463/43

(58) Field of Classification Search ................... 463/23, 463/24, 30, 31, 43, 44, 1
See application file for complete search history.

(56) References Cited

U.S. PATENT DOCUMENTS

| 4,738,451 | A | * | 4/1988 | Logg | 463/2 |
| 5,971,855 | A | * | 10/1999 | Ng | 463/42 |
| 6,159,100 | A | * | 12/2000 | Smith | 463/42 |
| 6,210,273 | B1 | | 4/2001 | Yasumi | |
| 6,251,014 | B1 | * | 6/2001 | Stockdale et al. | 463/16 |

FOREIGN PATENT DOCUMENTS

| EP | 1 033 158 A | 9/2000 |
| EP | 03029841 | 7/2004 |
| JP | H11-272841 A | 10/1999 |

(Continued)

OTHER PUBLICATIONS

Super Nintendo Entertainment System, The Legend of Zelda -A Link to the Past, 1992, Nintendo Of America, pp. 9,11,27, and 28.*

(Continued)

*Primary Examiner*—John M Hotaling, II
*Assistant Examiner*—Adetokunbo Torimiro
(74) *Attorney, Agent, or Firm*—Duane Morris LLP

(57) ABSTRACT

Game program has a procedure for renewing, for reducing a value of a life power parameter according to volume of damage received and for renewing it, a procedure for setting parameter value, for setting the value of the life power parameter reduced and renewed as a standard parameter value and for storing it in a memory, a procedure for recovering, for increasing the value of the life power parameter by a value of recovery parameter which is set on a recovery item which is instructed to be used by a player and for renewing it, a procedure for reducing, for reducing the value of the life power parameter in the memory which was increased and renewed at a predetermined reduction velocity with the passage of time and for renewing it.

11 Claims, 4 Drawing Sheets

FOREIGN PATENT DOCUMENTS

JP          2003-135846 A     5/2003

OTHER PUBLICATIONS

Konami, Crime Fighters, 1989, p. 24.*
Final Fantasy from "http://jarcas.dreamhosters.com/rdocs/Final_Fantasy_IX_-_Manual_-_PSX.pdf".*
Halo from "http://jarcas.dreamhosters.com/rdocs/Halo_-_Manual_-_XBX.pdf".*
Regen from "http://finalfantasy.wikia.com/wiki/Regen".*
"*Coin Journal December/2000* (Planet Harriers)", published by EI-Create on Nov. 30, 2000, p. 243.

* cited by examiner

Fig.3

| CHARACTER | PARTS | DAMAGE | NATURAL RECOVERY VELOCITY | PARAMETER REDUCTION VELOCITY |
|---|---|---|---|---|
| CR1 | HAND | 10 | 6.0 | 1.0 |
| | ARM | 20 | 3.0 | 1.5 |
| | FOOT | 15 | 4.5 | 2.0 |
| | WAIST | 40 | 1.5 | 7.0 |
| | HEAD | 35 | 2.0 | 4.0 |
| | BODY | 45 | 1.0 | 4.5 |

Fig.4

| CHARACTER | DAMAGED PARTS |
|---|---|
| CR1 | RIGHT HAND, LEFT FOOT |
| CR2 | HEAD |

DAMAGE CONTROL GAME PROGRAM AND GAME MACHINE

BACKGROUND OF THE INVENTION

The invention relates to game program for being executed with a computer, and more specifically to game program and a game machine for controlling damage to a parameter concerning life power, the parameter being set on a character in a game.

A character appearing in a game, such as an action game, an adventure game and a role playing game, has a parameter concerning life power of the character going by the name of "HP" ("the life power parameter" hereinafter) as data.

This parameter reduces by a predetermined volume when receiving attack from an enemy in a battle with the enemy, and recovers by executing an event, such as using of an item, such as recovery medicine, and taking a rest at inn which is set in the game world. If this parameter is zero, the character is in a fight-impossible state or in a death state. And, the upper limit value of the parameter is set for each character. In many cases, the upper limit value of the parameter is changed to increase by obtaining an experiential value in a battle between the character and the enemy.

In a conventional game, a player recovers the value of the life power parameter by using an item, such as recovery medicine, on a character operated by the player in the game world ("the operated character" hereinafter) or by getting the character to take a rest at inn through an operation of a controller when the life power parameter reduces up to a predetermined value and it is necessary to recover the reduced parameter. In such a case, the life power parameter generally recovers up to a predetermined value with a rush and the recovered value is controlled to be maintained in the game program if no battle occurs.

In such a control, the character may recover up to the best life power state in a moment with using the item when receiving damage, so that extremely unnatural phenomenon in a usual world occurs in the game world. Then, the player strongly feels difference between the real world and the game world and loses a feeling of intimacy to the character in the game, so that the fun of the game is decreased.

Due to these reasons, developments of the damage control game program and the damage control game machine for more realistically recovering the life power parameter when recovering damage received on the character are still desired.

SUMMARY OF THE INVENTION

The invention is damage game control program being used in a game program, the game program being a program for getting each character to take an action in a game world on the basis of a value of life power parameter which is set on the each character and for displaying said action on a monitor as an image, comprising:

an item data file for storing a recoverable value of the life power parameter concerning a recovery item for temporarily recovering the value of the life power parameter of the character, the damage control game program being a program for getting a computer to execute the following procedures, comprising:

a procedure for renewing life power parameter, for reducing a value of the life power parameter which is set on the character and is stored in a memory of the computer according to volume of damage received on the life power parameter of the character in the game world and for renewing it;

a procedure for setting standard parameter value, for setting the value of the life power parameter reduced and renewed by the procedure for renewing life power parameter as a standard parameter value and storing it in the memory of the computer;

a procedure for recovering life power parameter, for reading a value of recovery parameter which is set on a recovery item which is instructed to be used by a player through input means out of the item data file, for increasing the value of the life power parameter of the character stored in the memory by a value corresponding to a value of the read recovery parameter concerning the character who received the damage and for renewing it; and a procedure for reducing life power parameter, for reducing the value of the life power parameter in the memory which was increased and renewed by the procedure for recovering life power parameter up to the standard parameter value at a predetermined reduction velocity with the passage of time and renewing it.

According to this aspect of the invention, the life power parameter temporarily recovered from the standard parameter value with the recovery item is controlled to be computed so as to be gradually reduced up to the standard parameter value by the procedure for reducing life power parameter, so that such a phenomenon often appearing in the usual world wherein life power parameter can not be fully recovered even if the recovery item is used in the state where the damage received from the enemy character has not been fully recovered and then, the character goes against nature can be reproduced in the game world. Then, the game program or the game machine which is realistic in the aspect of the damage recovery can be provided.

Besides, another aspect of the invention is the damage control game program, wherein the game program stores a damage data file (PPL) for showing volume of damage (DD) to be received when the character receives attack from an enemy character in a battle scene in the game world by parts (PT) of a body, the damage control game program is a program for getting the computer to further execute a procedure for judging damaged parts, for judging damaged parts of damage which the character received from the enemy character in the battle scene and storing it in the memory (such as the damage parts list as shown in FIG. 4), and a procedure for deciding volume of damage, for deciding the volume of the damage received on the life power parameter of the character according to the damaged parts stored in the memory, referring to the damage data file, and the procedure for renewing life power parameter reduces the value of the life power parameter on the basis of the volume of damage decided by the procedure for deciding volume of damage, and renews it.

According to this aspect of the invention, the damage to be received by the character can be changed according to the parts of the body receiving the damage, so that the real game program can be provided.

Another aspect of the invention is the damage control game program, wherein the damage data file is stored by each character.

According to this aspect of the invention, the damage data file is stored by the character, so that the damage can be delicately expressed.

Another aspect of the invention is the damage control game program, wherein the damage control game program is program for getting the computer to further execute a procedure for recovering and computing standard parameter value, for recovering the standard parameter value stored in the memory by the procedure for setting standard parameter at a predetermined recovery velocity with the passage of time and for renewing it.

According to this aspect of the invention, the standard parameter value is recovered at a predetermined recovery velocity with the passage of time by the procedure for recovering and computing standard parameter value and is renewed, so that such a state that the physical strength of the character is gradually recovered can be expressed, and the operation of recovery of the life power parameter can be more naturally expressed.

Another aspect of the invention is the damage control game program, wherein the damage control game program stores a recovery velocity file for showing the recovery velocity by the parts of the body, the damage control game program is program for getting the computer to further execute a procedure for judging damaged parts, for judging damaged parts of damage which the character received from the enemy character in the battle scene and for storing it in the memory, and a procedure for deciding recovery velocity, for deciding the recovery velocity according to the damaged parts stored in the memory, referring to the recovery velocity file, and the procedure for recovering and computing standard parameter value recovers the standard parameter value stored in the memory by the procedure for setting standard parameter at the recovery velocity decided by the procedure for deciding recovery velocity and renews it.

According to this aspect of the invention, the standard parameter value is controlled so that the recovery velocity is different every parts which received damage. Then, the realistic game program can be provided.

Another aspect of the invention is the damage control game program, wherein the recovery velocity file is stored by each character.

According to this aspect of the invention, the recovery velocity file is stored by each character, so that the damage can be delicately expressed.

Another aspect of the invention is the damage control game program, wherein the damage control game program stores a reduction velocity file for showing the reduction velocity by the parts of the body, the damage control game program is program for getting the computer to further execute a procedure for judging damaged parts, for judging damaged parts of damage which the character received from the enemy character in the battle scene and for storing it in the memory, and a procedure for deciding reduction velocity, for deciding the reduction velocity according to the damaged parts stored in the memory, referring to the reduction velocity file, and the procedure for reducing life power parameter reduces the value of the life power parameter in the memory increased and renewed by the procedure for recovering life power parameter at the reduction velocity decided by the procedure for deciding reduction velocity up to the standard parameter value with the passage of time and renews it.

According to this aspect of the invention, the value of the life power parameter is controlled so that the reduction velocity is different every parts which received damage. For instance, "impossible to overwork" state can be expressed by making the reduction velocity higher when receiving damage on the important parts, and the realistic game program can be provided.

Another aspect of the invention is the damage control game program, wherein the reduction velocity file is stored by each character.

According to this aspect of the invention, the reduction velocity file is stored by the character, so that the damage can be delicately expressed.

Another aspect of the invention is game machine for getting each character to take an action in a game world on the basis of a value of life power parameter which is set on the each character and for displaying said action on a monitor as an image, comprising:

an item data file for storing a recoverable value of the life power parameter concerning a recovery item for temporarily recovering the value of the life power parameter of the character, means for renewing life power parameter, for reducing a value of the life power parameter which is set on the character and is stored in a memory according to volume of damage received on the life power parameter of the character in the game world and for renewing it;

means for setting standard parameter value, for setting the value of the life power parameter reduced and renewed by the means for renewing life power parameter as a standard parameter value and storing it in the memory;

means for recovering life power parameter, for reading a value of recovery parameter which is set on a recovery item which is instructed to be used by a player through input means out of the item data file, for increasing the value of the life power parameter of the character stored in the memory by a value corresponding to a value of the read recovery parameter concerning the character who received the damage and for renewing it; and means for reducing life power parameter, for reducing the value of the life power parameter in the memory which was increased and renewed by the means for recovering life power parameter up to the standard parameter value at a predetermined reduction velocity with the passage of time and for renewing it.

The number in parentheses shows the corresponding element in the drawings for the sake of convenience, accordingly, the present descriptions are not restricted and bound by the descriptions on the drawings.

BRIEF DESCRIPTION OF THE DRAWINGS

FIG. 3 is a view showing volume of damage, natural recovery velocity and parameter reduction velocity every damaged parts, and FIG. 4 is a view of a damage parts list of each character.

DESCRIPTION OF THE PREFERRED EMBODIMENT

An embodiment of the invention is now explained, referring to appended drawings.

Figure 1:
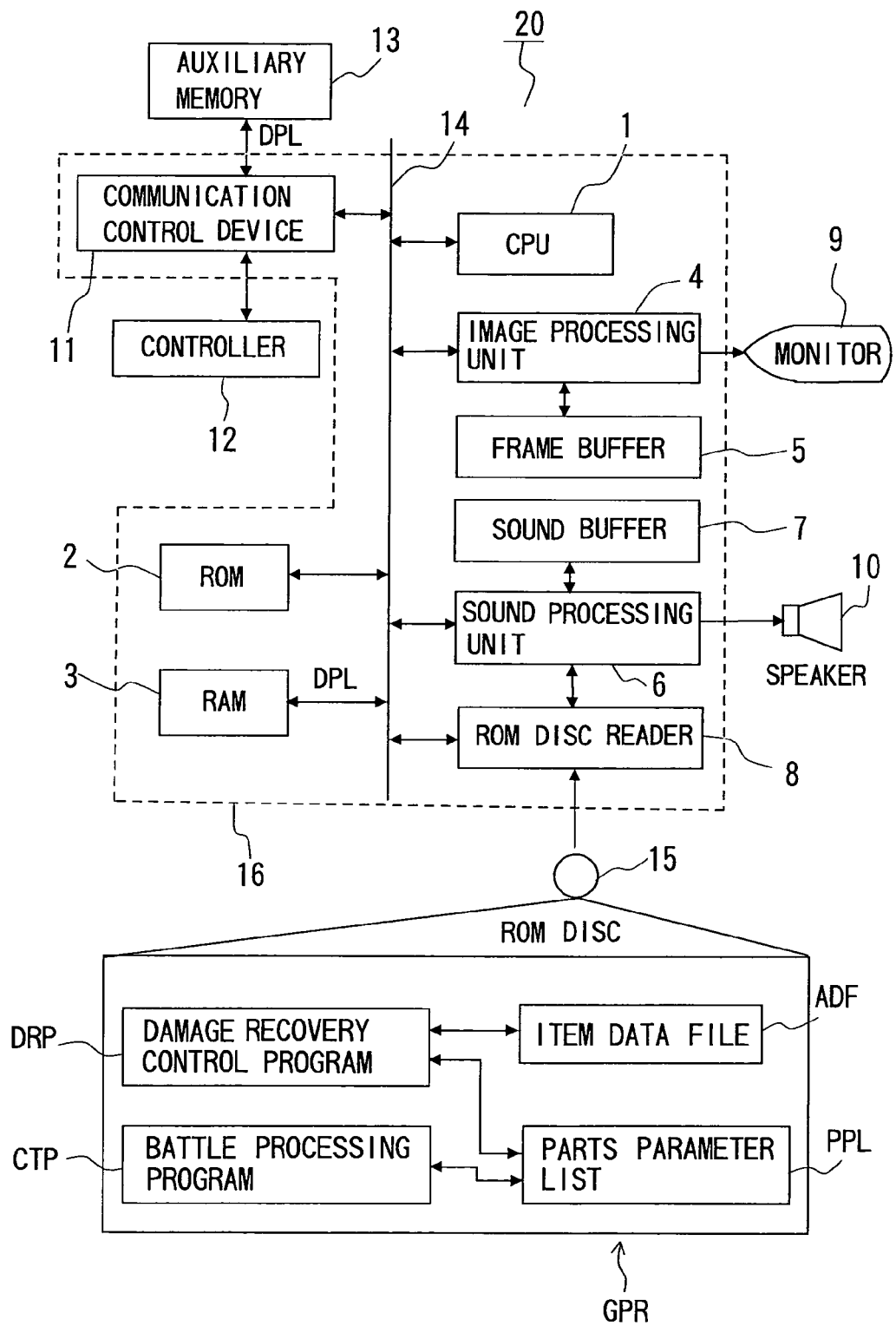
FIG. 1 is a block diagram of a game machine for home use to which the present invention is applied, FIG. 2 are gauges showing increase or decrease of life power parameter.

A game machine 20 is one for executing a predetermined game according to program for game which is stored in a ROM disc 15 as a storage medium, such as an adventure game, as shown in FIG. 1. The game machine 20 has a CPU 1, main body of which is a microprocessor, a ROM 2 and a RAM 3 as main memories with respect to the CPU 1, an image processing unit 4 and a sound processing unit 6, and buffers 5, 7 with respect to both units, and a ROM disc reader 8. An operating system which is program necessary for controlling the whole operations in the game machine is written in the ROM 2. In the RAM 3, program and data for game read from the ROM disc 15 as a storage medium are stored according to its necessity. And, the image processing unit 4 receives image data from the CPU 1, and draws a game picture on the frame buffer 5, and converts the data of the drawn image into predetermined video regenerative signal, and outputs the signal to a monitor 9 with a predetermined timing. The sound processing unit 6 copies data of voice or sound, and data of the sound source which are read out from the ROM disc 15 and stored in the sound buffer 7, and gets a speaker 10 to output. The ROM disc reader 8 reads program and data which are stored in the ROM disc 15 according to an instruction from the CPU 1, and outputs a signal corresponding to the read contents. Program and data necessary for execution of the game are stored in the ROM disc 15. As the monitor 9 and the speaker 10, a home television receiver and a built-in speaker of the television receiver are generally used.

A communication control device 11 is connected with the CPU 1 through a bus 14, and a controller 12 as an input device and an auxiliary memory 13 are attachably and detachably connected with the device 11 through proper connection ports. The controller 12 functions as an input device, and has operation members, such as an operation key, for receiving the operation by a player. The communication control device 11 scans the state of the operation of the controller 12 at predetermined cycles (at sixty cycles per a second, for instance), and outputs the signal corresponding to the scanned result to the CPU 1. The CPU 1 judges the state of the operation of the controller 12 on the basis of the signal. A plurality of the controllers 12 and the auxiliary memories 13 may be connected with the communication control device 11 in parallel.

The components in the above-mentioned structure excluding the monitor 9, the speaker 10, the controller 12, the ROM disc 15, and the auxiliary memory 13 are stored together in a predetermined housing so as to comprise a machine body 16. This machine body 16 functions as a computer.

Game program GPR through which a game, such as an action game, a role playing game, and an adventure game, proceeds according to a predetermined scenario, is stored in the ROM disc 15.

In the game machine 20, the CPU 1 firstly executes a predetermined initialization process according to the program of the ROM 2 after a predetermined initialization operation (the operation of turning the power on, for instance). When the initialization finishes, the CPU 1 starts to read the game program GPR which is stored in the ROM disc 15, and starts game processing according to the program. When a player executes a predetermined game start operation on the controller 12, the CPU 1 starts various processing necessary for the execution of the game according to the routines of the game program GPR on the basis of the instruction.

Thereafter, the game machine 20 executes predetermined processes according to the read game program GPR, controls to display the picture on the monitor 9, and controls so that a predetermined scenario can proceed.

In the middle of the progress of the game, many scenes of battle where the operated character which is operated by a player or another character fights against an enemy character in a game world are set by the game program GPR. In such a battle, the character may generally receive damage by the attack of the enemy character. In such a case, the game program GPR executes arithmetic processing for subtracting a value of life power parameter which is set on the character and is stored in a proper memory, such as the RAM 3, according to volume of received damage in order to obtain the renewal value, changes the former life power parameter value in the memory into the subtracted life power parameter value for its renewal, and displays the renewed value of life power parameter on the monitor 9 as a gauge or a numerical value through the image processing unit 4 on the basis of battle processing program CTP which is stored in the game program GPR.

A scene where each character CR receives damage on the life power parameter may also appear in an event in the game world, the event being set according to some development of the scenario in the game program GPR, in addition to in battle.

A predetermined value of life power parameter LP is set for each character CR. The life power parameter in an initial state is a full parameter value FV. The value of the life power parameter reduces when receiving an attack from the enemy character in a battle, as mentioned before. And, the value of the life power parameter is controlled to increase when executing some recovery procedure on the basis of an instruction from a player through the controller 12 or on the basis of damage recovery control program DRP mentioned hereinafter which is stored in the game program GPR.

Each character CR can take an action within the bounds of the life power parameter which is set on the character in the game world on the basis of the game program GPR, and such action is displayed as an image of the corresponding character CR on the monitor 9 through the CPU 1 and the image processing unit 4.

If the value of the life power parameter becomes zero (0), the game program GPR processes for removing the character from members for battle in producing the scene of battle through the image processing unit 4. In the concrete, the character CR image is written in the frame butter 5 in order to display the character CR laying himself or herself in a stationary state on a field where a battle occurs, and such image is displayed on the monitor 9.

A parts parameter list PPL in the game program GPR stores the volume of damage which each character CR receives in a battle, as shown in FIG. 3. The battle processing program CTP gets the CPU to judge as to whether or not the character CR received damage from the enemy character in a battle scene. If yes, the battle processing program CTP judges which parts of the character CR the enemy character attacked through the CPU 1, and the result is temporarily stored in a memory, such as the RAM 3. Subsequently, the program CTP reads out damage data DD which is set for each parts of each character CR, showing volume of damage, referring to the parts parameter list PPL.

The game program GPR stores the parts parameter list PPL in the RAM 3 from the ROM disc 15 at a proper point of time after game start, and then, the respective damage data DD are read out of the parts parameter list PPL stored in the RAM 3. But, such data may be directly read out of the ROM 15 without storing the list PPL in the RAM 3.

As shown in FIG. 3, the parts parameter list PPL stores the volume of damage when receiving the attack from the enemy character for each parts PT of a body of each character CR as the damage data DD. If it is necessary to differentiate one character CR from another, each character CR is shown with the character CR attaching a numeral thereto, such as character CR1, CR2 . . . CRn. But, if not, it is shown with only "character CR". The battle processing program CTP reads out the damage parts PT of the character CR which is temporarily stored in the memory if the character CR received damage from the enemy character in the scene of a battle, refers to the read damage parts PT and the parts parameter list PPL, reads out the damage data DD which is set on the parts PT of the character CR which received damage, and determines the volume of damage which the character CR received. The battle processing program CTP thus subtracts the determined volume of damage from the value of the life power parameter of the character CR which is stored in the memory so as to renew the value.

The value of the damage data DD for each parts PT shown in the parts parameter list PPL is exemplary, and can be optionally set. Besides, the damage data DD may be also set for each enemy character.

The battle processing program CTP produces a damage parts list DPL as shown in FIG. 4 in the memory, such as the RAM 3 if each character CR receives damage from the enemy character in the scene of a battle in order to store parts DP which was damaged for each character CR. The damage parts list DPL memorizes and stores the damaged parts DP for each character CR1, CR2, . . . . The damaged parts DP stored in the damage parts list DPL includes the parts damaged by the enemy character in the past battle which has not yet been recovered ("recovery" is explained hereinafter) without being deleted in addition to the parts damaged in this time of battle.

For instance, the character CR1 has damages in right hand and left foot, as shown in FIG. 4, and these damages have not yet been recovered at present. And, the character CR2 has damage in head, and the damage has not yet recovered at present.

When the game is over in the middle thereof, the CPU 1 stores this damage parts list DPL as save data in the auxiliary memory 13 on the basis of the saving procedure which is stored in the game program GPR with the instruction from a player through the controller 12.

The battle processing program CTP always watches the value of the life power parameter of each character entering in the battle, which is stored in the memory through the CPU 1. The program CTP takes a procedure for writing a flag showing incapability of fight at a corresponding address position of the memory, such as the RAM 3 which stores the information concerning the character when judging that the value of the life power parameter becomes zero (0) or lower (the battle processing program CTP generally fixes the value of the life power parameter in the memory as zero (0), thinking that the character is impossible to fight if the value of the life power parameter is under zero (0)), and for removing the character from the members entering in the battle.

When thus finishing the battle, the battle processing program CTP takes a procedure for recovering the life power parameters of the respective characters excluding the character who is impossible to fight on the basis of the damage recovery control program DRP which is stored in the game program GPR.

That is, if the player instructs the CPU 1 to recover the damage through the controller 12 at a proper point of time after finish of the battle and the instruction is outputted to the CPU 1, the CPU 1 reads the damage recovery control program DRP out of the game program GPR and takes a procedure for recovering the value of the life power parameter of each character on the basis of the damage recovery control program DRP.

Figure 2:
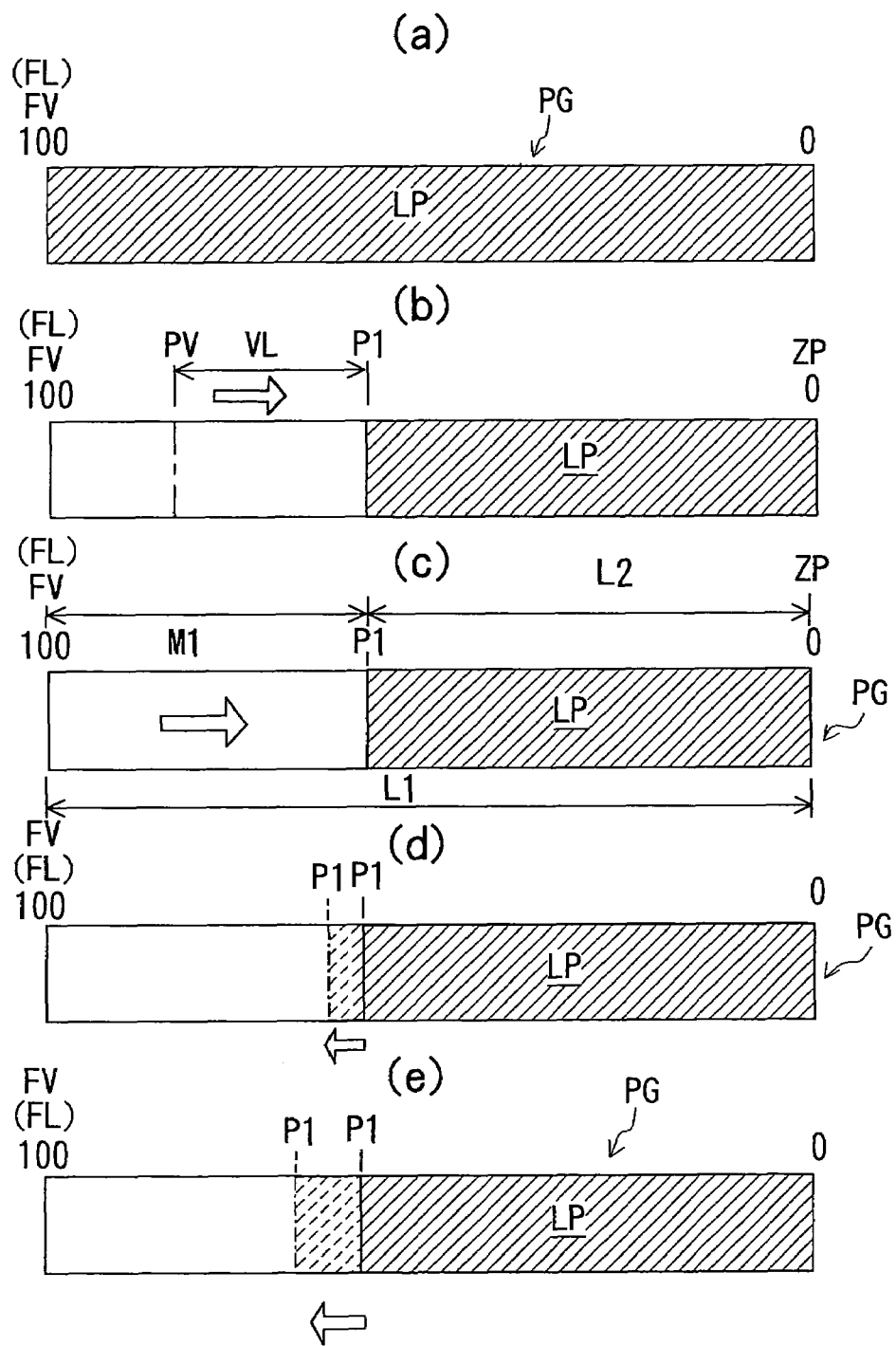

When the value of the life power parameter of some character was changed from full state FL as shown in FIG. 2(a) into a state as shown in FIG. 2(c) where predetermined volume M1 is subtracted from the full state FL due to the battle with the enemy character, that is, when some character received M1 of damage due to the battle, the value of the life power parameter in the memory is the value P1 obtained by subtracting M1 from the full state FL, as mentioned before. The game program GPR produces a life power parameter gauge PG and the present parameter value P1 and displays both on the monitor 9 through the image processing unit 4 and the frame buffer 5 which is an image memory on the basis of the parameter value P1, as shown in FIG. 2(c).

The life power parameter gauge PG is shown with a graph in the shape of a strip wherein the full state FL is the whole length L1. The present value of the life power parameter of the character is shown with an area defined by length L2 between a position shifted predetermined volume M1 to the right side from the full state FL and a state ZP where the value of the parameter is zero (0).

How to display the life power parameter gauge PG is optional, and the gauge PG may be displayed with a graph, a numeric value or another proper one.

Then, the player instructs the damage recovery control program DRP to recover the damage of each character CR through the operation of the controller 12 through the CPU 1. Eve if no damage recovery is instructed by the player, the damage recovery control program DRP gets the CPU 1 to watch elapsed time T after battle, and takes procedure for recovering the damage of each character CR according to the elapsed time T.

That is, the damage recovery control program DRP controls to naturally recover the life power parameter P1 of each character CR at a natural recovery velocity, which is set for each damage parts PT, for the full state FL according to the elapsed time T after battle. In this natural recovery control, the damage recovery control program DRP thus gradually recovers the life power parameter value P1 of each character CR on the basis of a natural recovery velocity NRV which is set for the parts PT of each character CR, referring to the parts parameter list PPL as shown in FIG. 3. This action is done in such a manner that the CPU 1 computes the life power parameter value of each character CR stored in a memory so as to increase it on the basis of the natural recovery velocity NRV as shown in the parts parameter list PPL at a predetermined cycle, and renews the former life power parameter value so as to become the computed life power parameter value.

The natural recovery velocity NRV is set for each damaged parts PT of each character CR in the parts parameter list PPL as shown in FIG. 3. The more important parts, such as waist, head and body, it is, the lower the natural recovery velocity NRV thereof is. On the contrary, the more peripheral parts, such as hand, arm and foot, it is, the higher the natural recovery velocity NRV thereof is. Each numeric value as shown in the natural recovery velocity NRV is exemplary and is used only for showing relative magnitude. These numeric values may be optionally set.

If the character CR receives the damage in a battle, so that the life power parameter value is reduced up to the parameter value P1 as shown in FIG. 2(c), the damage recovery control program DRP sets the value of the life power parameter reduced up to the parameter value P1 as a standard parameter value P1, and stores it in a memory, such as the RAM 3. The standard parameter value P1 is controlled to be renewed so as to be gradually increased for the full state FL with the passage of time after battle as shown in FIG. 2(d) and (e). Such state that a human being is hurt and naturally recovers with a passage of time can thus appear in the game, so that realistic development of the game is possible.

That is, a basic action set for recovering the life power parameter of each character CR in the game program GPR is a recovery state on the basis of the natural recovery velocity NRV with the damage recovery control program DRP, and another recovery of the parameter by using a recovery item with the instruction of the player through the controller 12 is dealt with as a temporary recovery action.

Each character CR has the standard parameter value P1 lower than the full parameter value FV in the full state FL of the life power parameter which is set for the character, the standard parameter value P1 being renewed according to the basic recovery action, and the state of the standard parameter value P1 shows so called "wounded state". The "wounded state" continues till the recovery of the standard parameter value of the character CR up to the full state FL by the natural recovery velocity NRV which is set in the damage recovery control program DRP. The standard parameter value P1 is stored in a memory, such as the RAM 3, for each character CR. When temporarily finishing the game, the standard parameter value P1 is stored in the auxiliary memory 13 as a part of save data by the CPU 1 with the instruction from the player through the controller 12.

When the standard parameter value P1 is naturally recovered up to the life power parameter value which is set as the full state FL of the life power parameter for the character CR (referred to as only "full parameter value FV") and the correspondence between the standard parameter value P1 and the full parameter value FV is judged with comparison and computing by the damage recovery control program DRP, complete recovery of the damage on the damaged parts DP is judged.

In this case, the character CR gets rid of "wounded state", and the damaged portion DP which has been stored for the character CR is erased from the damage parts list DPL.

When judging that the character CR is in "the wounded state", that is, that the standard parameter value of some character CR does not reach the full state FL of the life power parameter which is set for the character CR, the damage recovery control program DRP stores a flag showing "wounded state" for the character CR in a memory, such as the RAM3, corresponding to the character CR. The damage parts list DPL for each character CR as shown in FIG. 4 may be substituted for this flag. That is, the damage recovery control program DRP judges that the character CR having some damaged parts DP in the damage parts list DPL is in "wounded state".

If some character CR is in "wounded state" and a player instructs use of an item for temporarily recovering the value of the life power parameter, such as a recovery item, through the operation of the controller 12, the damage recovery control program DRP reads the value of the life power parameter through which the character can recover (referred to as only "recovery parameter value VL" hereinafter), the value being set as a parameter for the recovery item the use of which was instructed, out of an appropriate item data file ADF in the game program GPR (or reads the value out of the RAM 3 which stores the item data file ADF read out of the ROM disc 15), and computes the value of the life power parameter of the character CR, adding the value corresponding to a recovery parameter value VL which is shown in the item data file ADF to the present standard parameter value P1, and renews the value of the life power parameter of the corresponding character CR in the memory (at this time, the standard parameter value P1 which is stored in another address position in the memory is unchanged).

In result, the value of the life power parameter of the corresponding character CR in the memory becomes temporarily bigger than the standard parameter value by the value corresponding to the recovery parameter value VL, and the life power parameter gauge PG is displayed on the monitor 9 as shown in FIG. 2(b), extending for the left hand in the figure from the standard parameter value P1 by the recovery parameter value VL.

Then, the recovery control program DRP judges as to whether or not the present parameter value P1 of the character CR who recovered with the use of the recovery item by the instruction of the player is smaller than the full parameter value FV of the character CR, that is, the character is in "wounded state", by referring to the damage parts list DPL in the RAM 3. As already mentioned, the character CR having some damaged parts DP in the damage parts list DPL is judged as being in "wounded state" where the present parameter value P1 is smaller than the full parameter value FV since the character received damage in the past battle and has not yet recovered. The recovery control program DRP reads out the damaged parts DP which the corresponding character CR has at present, and stores it in an appropriate buffer memory.

Subsequently, the recovery control program DRP refers to the parts parameter list PPL, so that the parameter reduction velocity PRV of the parts PT corresponding to the damaged parts DP of the character CR who is judged to be in "wounded state", the damaged parts DP being stored in the buffer memory, is read out of a table of parameter reduction velocity PRV which is set for the character CR.

As shown in FIG. 3, a table of the parameter reduction velocity PRV stores the parameter reduction velocity PRV when using means for temporarily recovering the life power parameter, such as the recovery item, on each parts PT of each character CR being in "wounded state".

Physical strength of the character CR being in "wounded state" has not fully recovered due to the wound, and the recovery of the physical strength exceeding a natural recovery state with the recovery item invites such a state where the physical strength of the character CR is consumed. Such a state often appears in a usual life. Then, such a state that the character CR goes against nature with the physical strength at the present point of time (the standard parameter value P1) can be expressed in the game program GPR according to the invention.

That is, when the value of the life power parameter of the character CR reaches a value PV exceeding the standard parameter value P1 with the use of means for temporarily recovering the life power parameter, such as the recovery item, through the instruction from a player as shown in FIG. 2(b), the recovery control program DRP computes through the CPU 1 so as to reduce the recovery parameter value VL exceeding the standard parameter value P1 with the passage of time on the basis of the parameter reduction velocity PRV, and starts to process for reducing the value of the life power parameter of the character CR in the memory from the value PV to the standard parameter value P1 so as to renew the value.

The more important, such as waist, head and body, the parts is, the higher the preset value of the parameter reduction velocity PRV as shown in the table of the parameter reduction velocity PRV of FIG. 3 is. The more important the damaged parts DP of the character CR which is stored in the damage parts list DPL is, the sooner the value of the life power parameter returns to the standard parameter value P1 even if it is recovered with the recovery item. That is, the effects of the recovery operation with the recovery item is little.

Then, the value of the life power parameter temporarily recovered exceeding the standard parameter value P1 with the recovery item is controlled to be renewed, reducing for the standard parameter value P1 at a predetermined parameter reduction velocity PRV. So, the character CR can take an action with the value of the life power parameter increased with the recovery item only at the beginning of a battle scene, but hard fight is forced on the character CR with the passage of time because of reduction of the life power parameter by damage received from the enemy character and the life power parameter reduced at the parameter reduction velocity PRV, so that the real battle scene can appear.

Each numeric value as shown in the table of the parameter reduction velocity PRV of FIG. 3 is exemplary, and is used for only showing its relative magnitude. So, these numeric values can be optionally set.

The damage recovery control program DRP always watches the value of the life power parameter which reduces at the parameter reduction velocity PRV with the passage of time, and the program DRP stops a procedure for subtracting the life power parameter on the basis of the parameter reduction velocity PRV when the renewed value of the life power parameter of the character CR which is stored in the memory becomes equal to the standard parameter value P1 of the character CR at this point of time. Then, the value of the life power parameter of the character CR is controlled so as not to fall below the standard parameter value P1 as long as the character CR does not receive new damage due to battle.

The damage recovery control program DRP continues through the CPU 1 to compute recovery of the standard parameter value P1 on the basis of the natural recovery velocity NRV for each character CR being in "wounded state" having the damaged parts DP in the damage parts list DPL even during processing for reducing the life power parameter at the parameter reduction velocity PRV. Then, the standard parameter value P1 of each character CR recovered due to natural recovery and the value of the life power parameter changing by the procedure for reducing on the basis of the parameter reduction velocity PRV are separately stored and controlled in a memory, such as the RAM 3.

The damage parts list DPL may have damage image data DID representing concrete position of body which received damage on image of human body for each character CR in addition to the damaged parts DP, and the damage image data DID is stored in the frame buffer 5 which is an image memory through the CPU 1 and the image processing unit 4 so as to display it on the monitor 9 according to an instruction of a player through the controller 12, so that the player can perceive the wounded state of each character CR as an image.

Besides, the damage image data DID may be stored as "old wound", attaching an proper flag thereto without deleting even after each damage parts DP of each character CR as shown in the damage parts list DPL recovers naturally, and the "old wound" which finished recovery and the present damaged parts DP are written in the frame buffer 5 through the image processing unit 4 so as to differentiate both from each other by color and form of displaying according to the instruction of a player through the controller 12, and they are displayed on the monitor 9. With this procedure, the player can confirm the damaged parts DP received by a character operated by the player in the past battle on a scope, and thus becomes attached to the character CR, so that the fun of the game can be increased.

Furthermore, a method of recovery of the standard parameter value P1 of each character CR is not limited to one with the natural recovery velocity NRV as shown in the parts parameter list PPL, but is set in the game program GPR, relating to an event, such as "Operation" and "Medical treatment" set in the game. Then, a player may select the method of recovery of the standard parameter value P1 out of recovery procedure menu which the game program GPR displays on the monitor 9 through the CPU 1 and the image processing unit 4.

In this case, the damage recovery control program DRP reads out through the CPU 1 the recovery velocity of the standard parameter value P1 which is set in an appropriate file in the game program GPR according to the recovery procedure menu selected by the player through the controller 12, and computes for recovering the standard parameter value P1 of the character CR on the basis of the read recovery velocity.

In the above-mentioned embodiment, the CPU 1 comprises a game control unit, and the combination of the CPU 1 and specific software comprises various kinds of means of the game control unit, but at least a part of these means may be replaced by a logical circuit. Besides, the invention may be comprised as variously scaled game systems in addition to as a game system for home use.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A damage control game program embodied in a computer readable medium being used in a game program, for getting each character to take an action in a game world on the basis of a value of life power parameter which is set on said each character and for displaying said action on a monitor as an image, comprising:

an item data file for storing a recoverable value of said life power parameter concerning a recovery item for temporarily recovering said value of said life power parameter of said character, said game program for setting a standard parameter value which shows a wounded state of said character in connection with said life power parameter, and a parameter value which shows present life power of said character;

said damage control game program for executing the following procedures, a procedure for renewing life power parameter, for reducing said value of said life power parameter which is set on, said character and is stored in a memory of a computer according to a volume of damage received on said life power parameter of said character in said game world and renewing it;

a procedure for setting standard parameter value, for setting said value of said life power parameter reduced and renewed by said procedure for renewing life power parameter as said standard parameter value and storing it in said memory of said computer;

a procedure for natural recovery, for expressing a wounded state of said character by gradually successively recovering and renewing said standard parameter value which is stored in said memory by said procedure for setting standard parameter value at a predetermined natural recovery velocity with a passage of time up to a full state of said life power parameter of said character;

a procedure for temporary recovery, for reading a value of a recovery parameter which is set on a recovery item which is instructed to be used by a player through input means out of said item data file which stores a value of said recoverable life power parameter concerning a recovery item through which said value of said life power parameter of said character can be temporarily recovered, and for increasing said value of said life power parameter of said character stored in said memory, independent of said standard parameter value by a value corresponding to a value of said read recovery parameter concerning said character who received said damage and for renewing it;

a procedure for controlling said procedure for natural recovery and said procedure for temporary recovery, independently from each other;

a procedure for judging wounded state, for judging whether or not said standard parameter value of said character at the time when being recovered by said procedure for temporary recovery, is in a wounded state where the value is smaller than a full parameter value of said character;

a procedure for judging damage, for judging an amount of said damage received by said character from an enemy character in a battle and storing said amount of damage in a memory;

a procedure for determining reduction velocity, for determining a reduction velocity according to said amount of damage stored in said memory by accessing a reduction velocity file containing a reduction velocity value of said life power parameter for each of a plurality of body portions of said character; wherein in said reduction velocity file, the reduction velocity associated with a first set of body portions is greater than the reduction velocity associated with a second set of body portions;

a procedure for reducing life power parameter, for reducing said value of said life power parameter in said memory which was increased and renewed by said procedure for temporary recovery for said character, who has been judged to be in said wounded state by said procedure for judging wounded state, up to said standard parameter value at said reduction velocity which was determined by said procedure for determining reduction velocity with the passage of time and renewing it;

a procedure for storing damage image data, for storing a body position of said damaged portion of said character received from said enemy character in said battle scene on a body image as damage image data for each said character; a procedure for controlling an old wound, for storing said body position of said damage with is stored in said damage image data as an old wound without erasing even if said character naturally recovers from said wounded state up to a full state of said life power parameter of said character by said procedure for natural recovery;

and a procedure for displaying damage record, for displaying said old wound which has already been recovered and said damaged portion which has not yet been recovered on said monitor so as to differentiate in color and form to be displayed in response to an instruction from said player through said input means;

wherein an effect of said recovery item on said life power parameter in a recovery action when said first set of body portions receive damage is smaller than an effect of said recovery item on said life power parameter in a recovery action when said second set of body portions receive damage.

2. The damage control game program embodied in the computer readable medium according to claim 1, wherein said damage control game program is a program for getting said computer to further execute a procedure for deciding said volume of damage received on said life power parameter of said character according to said damaged parts stored in said memory, referring to a damage data file which contains a value of damage for each of a plurality of parts of said character's body, said volume of damage being received at the time when said character receives an attack from said enemy character in said battle scene in said game world, wherein said procedure for renewing life power parameter reduces said value of said life power parameter on the basis of said volume of damage decided by said procedure for deciding volume of damage, and renews it.

3. The damage control game program embodied in the computer readable medium according to claim 1, wherein said damage control game program is a program for getting said computer to further execute a procedure for deciding a natural recovery velocity by referring to a natural recovery velocity file which shows said natural recovery velocity for each of the plurality of body portions of said character, and said procedure for natural recovery recovers said standard parameter value stored in said memory by said procedure for setting standard, parameter at said natural recovery velocity decided by said procedure for deciding natural recovery velocity and renews it.

4. The damage control game program embodied in the computer readable medium according to claim 1, wherein said reduction velocity file is stored by each said character.

5. The damage control game program embodied in the computer readable medium according to claim 1, wherein the first set of body portions contains at least one body portion selected from the list consisting of a waist and a head, and the second set of body portions contains at least one body portion selected from the list consisting of a hand, an arm and a foot.

6. The damage control game program embodied in the computer readable medium according to claim 2, wherein said damage data file is stored by each said character.

7. The damage control game program embodied in the computer readable medium according to claim 3, wherein said natural recovery velocity file is stored by each said character.

8. A game machine for getting each character to take an action in a game world on the basis of a value of life power parameter which is set on said each character and for displaying said action on a monitor as an image, comprising:

an item data file for storing a recoverable value of said life power parameter concerning a recovery item for temporarily recovering said value of said life power parameter of said character, a standard parameter value which shows a wounded state of said character being set in said life power parameter, and a parameter value which shows present life power of said character;

means for renewing life power parameter, for reducing said value of said life power parameter which is set on said character and is stored in a memory according to volume of damage received on said life power parameter of said character in said game world and for renewing it;

means for setting standard parameter value, for setting said value of said life power parameter reduced and renewed by said means for renewing life power parameter as said standard parameter value and for storing it in said memory;

means for natural recovery, for expressing a wounded state of said character by gradually successively recovering and renewing said standard parameter value which is stored in said memory by said means for setting standard parameter value at a predetermined natural recovery velocity with a passage of time up to a full state of said life power parameter of said character;

means for temporary recovery, for reading a value of a recovery parameter which is set on a recovery item which is instructed to be used by a player through input means out of said item data file, for increasing said value of said life power parameter of said character stored in said memory, independent of said standard parameter value by a value Corresponding to a value of said read recovery parameter concerning said character who received said damage and for renewing it;

means for executing said means for natural recovery and said means for temporary recovery, independently from each other;

means for judging wounded state, for judging whether or not said standard parameter value of said character at the time when being recovered by said means for temporary recovery, is in a wounded state where the value is smaller than a full parameter value of said character;

means for judging damage, for judging an amount of damage received by said character from an enemy character in a battle and storing said amount of damage in a memory;

means for determining reduction velocity, for determining a reduction velocity according to said amount of damage stored in said memory by accessing a reduction velocity file containing a reduction velocity value of said life power parameter for each of a plurality of body portions of said character; wherein in said reduction velocity file, the reduction velocity associated with a first set of body portions is greater than the reduction velocity associated with a second set of body portions;

means for reducing life power parameter, for reducing said value of said life power parameter in said memory which was increased and renewed by said means for temporary recovery, for said character, who has been judged to be in said wounded state by said means for judging wounded state, up to said standard parameter value at said reduction velocity which was determined by said means for determining reduction velocity with the passage of time and for renewing it;

means for storing damage image data, for storing a body position of said damaged portion of said character received from said enemy character in said battle scene on a body image as damage image data for each said character;

means for controlling old wound, for storing said body position of said damage which is stored in said damage image data as an old wound without erasing even if said character naturally recovers from said wounded state up to a full state of said life power parameter of said character by said procedure for natural recovery; and means for displaying damage record, for displaying said old wound which has already been recovered and said damaged portion which has not yet been recovered on said monitor so as to differentiate in color and form to be displayed in response to an instruction from said player through said input means;

wherein an effect of said recovery item on said life power parameter in a recovery action when said first set of body portions receive damage is smaller than an effect of said recovery item on said life power parameter in a recovery action when said second set of body portions receive damage.

9. The game machine of claim 8, wherein the first set of body portions contains at least one body portion selected from the list consisting of a waist and a head, and the second set of body portions contains at least one body portion selected from the list consisting of a hand, an arm and a foot.

10. A game machine for getting each character to take an action in a game world on the basis of a value of life power parameter which is set on said each character and for displaying said action on a monitor as an image, comprising:

an item data file for storing a recoverable value of said life power parameter concerning a recovery item for temporarily recovering said value of said life power parameter of said character, a standard parameter value which shows a wounded state of said character being set in said life power parameter, and a parameter value which shows present life power of said character;

unit for renewing life power parameter, for reducing said value of said life power parameter which is set on said character and is stored in a memory according to volume of damage received on said life power parameter of said character in said game world and for renewing it;

unit for setting standard parameter value, for setting said value of said life power parameter reduced and renewed by said unit for renewing life power parameter as said standard parameter value and for storing it in said memory;

unit for natural recovery, for expressing a wounded state of said character by gradually successively recovering and renewing said standard parameter value which is stored in said memory by said unit for setting standard parameter value at a predetermined natural recovery velocity with a passage of time up to a full state of said life power parameter of said character;

unit for temporary recovery, for reading a value of a recovery parameter which is set on a recovery item which is instructed to be used by a player through input unit out of said item data file, for increasing said value of said life power parameter of said character stored in said memory, independent of said standard parameter value by a value corresponding to a value of said read recovery parameter concerning said character who received said damage and for renewing it;

unit for controlling said unit for natural recovery and said unit for temporary recovery, independently from each other;

unit for judging wounded state, for judging whether or not said standard parameter value of said character at the time which was renewed by said unit for temporary recovery, is in a wounded state where the value is smaller than a full parameter value of said character;

unit for judging damage, for judging an amount of damage received by said character from an enemy character in a battle and storing said amount of damage in a memory;

unit for determining reduction velocity, for determining a reduction velocity according to said amount of damage stored in said memory by accessing a reduction velocity file containing a reduction velocity value of said life power parameter for each of a plurality of body portions of said character; wherein in said reduction velocity file, said reduction velocity associated with a first set of body portions is greater than the reduction velocity associated with a second set of body portions;

unit for reducing life power parameter, for reducing said value of Said life power parameter in said memory which was increased and renewed by said unit for temporary recovery, for said character, who has been judged to be in said wounded state by said unit for judging wounded state, up to said standard parameter value at said reduction velocity which was determined by said reduction velocity determining unit with the passage of time and for renewing it;

unit for storing damage image data, for storing a body position of said damaged portion of said character received from said enemy character in said battle scene on a body image as damage image data for each said character;

unit for controlling an old wound, for storing said body position of said damage which is stored in said damage image data as an old wound without erasing even if said character naturally recovers from said wounded state up to a full state of said life power parameter of said character by said procedure for natural recovery; and unit for displaying damage record, for displaying said old wound which has already been recovered and said damaged portion which has not yet been recovered on said monitor so as to differentiate both in color and form to be displayed in response to an instruction from said player through said input means;

wherein an effect of said recovery item on said life power parameter in a recovery action when said first set of body portions receive damage is smaller than an effect of said recovery item on said life power parameter in a recovery action when said second set of body portions receive damage.

11. The game machine of claim 10, wherein the first set of body portions contains at least one body portion selected from the list consisting of a waist and a head, and the second set of body portions contains at least one body portion selected from the list consisting of a hand, an arm and a foot.

* * * * *